United States Patent [19]
Reed et al.

[11] Patent Number: 6,024,646
[45] Date of Patent: Feb. 15, 2000

[54] SWAGED PIN END OF PIPE CONNECTION

[75] Inventors: John F. Reed, Calgary; Trent M. V. Kaiser, Edmonton, both of Canada

[73] Assignee: IPSCO Enterprises Inc., Wilmington, Del.

[21] Appl. No.: 08/942,866

[22] Filed: Oct. 2, 1997

[51] Int. Cl.[7] ................................................. B21H 3/02
[52] U.S. Cl. .............................. 470/10; 285/333; 470/14
[58] Field of Search ................................. 285/333, 355, 285/390, 382; 470/10, 14, 84, 70; 451/48, 220

[56] References Cited

U.S. PATENT DOCUMENTS

| | | | |
|---|---|---|---|
| Re. 30,647 | 6/1981 | Blose | 285/332.2 |
| 1,875,708 | 9/1932 | Couhig | 285/333 |
| 2,818,343 | 12/1957 | Toulmin | 99/139 |
| 2,893,759 | 7/1959 | Blose | 285/333 |
| 3,224,799 | 12/1965 | Blose et al. | 285/334 |
| 4,192,533 | 3/1980 | Blose | 285/334 |
| 4,600,224 | 7/1986 | Blose | 285/334 |
| 4,676,529 | 6/1987 | McDonald | 285/382 |
| 4,736,967 | 4/1988 | Mott et al. | 285/94 |
| 4,830,411 | 5/1989 | Tsuru et al. | 285/334 |
| 5,007,665 | 4/1991 | Bovisio et al. | 285/334 |
| 5,330,239 | 7/1994 | Blose et al. | |
| 5,348,350 | 9/1994 | Blose et al. | 285/94 |
| 5,405,176 | 4/1995 | Babel et al. | 285/382 |
| 5,498,035 | 3/1996 | Blose et al. | |
| 5,681,059 | 10/1997 | Mackie | 285/382 |
| 5,709,417 | 1/1998 | Verbeck | 285/382 |
| 5,738,388 | 4/1998 | Sundelin | 285/382 |
| 5,826,921 | 10/1998 | Woolley | 285/382 |

FOREIGN PATENT DOCUMENTS 2116276  2/1982  United Kingdom .

*Primary Examiner*—Eric K. Nicholson
*Attorney, Agent, or Firm*—Robert H. Barrigar; Barrigar & Moss

[57] ABSTRACT

A swaged male element of a pipe connection of the type having a frusto-conical sealing surface adjacent to but separate from the load threads. The swaging is effected prior to final machining of the end of the pin and is followed by a cutting operation to remove surplus material from the interior surface of the pin. The swaging extends from the distal end of the pin proximally to include at least the distal end of the effective sealing surface, and preferably extends proximally to a point coinciding generally with the terminating proximal portion of the effective sealing area of the pin.

7 Claims, 3 Drawing Sheets

SWAGED PIN END OF PIPE CONNECTION

This patent application is directed to an improvement of the male element of a pipe connection of the type described in U.S. Pat. No. 5,498,035 (Blose et al, Mar. 12, 1996), and to a method of manufacturing same.

FIELD OF THE INVENTION

This invention relates to a male (pin) element for use in a threaded pipe connection, the male and female elements of which are provided with mating sealing surfaces adjacent to but separate from the load threads. Such connections are for use in interconnecting lengths of pipe casing or tubing made of steel or the like. A preferred previously known connection of this type is that described in U.S. Pat. No. 5,498,035. In the following description, both terms "coupling" and "connection" are used, usually interchangeably without preference. In the industry, sometimes the term "coupling" is used to refer to the female element, or to an axially short double female element for interconnecting the two pin ends of axially adjacent pipe lengths. The invention in another aspect relates to a method of manufacturing a male element of the foregoing type. (In this specification and the appended claims, the terms "element" and "component" are used interchangeably.)

BACKGROUND, PRIOR ART

In some industrial applications, steel tubing is subjected to severe stresses, and where a series of lengths of pipe or tubing have to be coupled together, the connection or coupling itself must be able to bear the applied stresses. For example, for use as oil well casing, such tubing may be subjected to thermal stresses imparted by steam injection into an oil or gas well where temperatures of the order of 650° F. may be reached. In the field, thermal stresses may subject the tubing to compressive and tensile axial loads approaching or conceivably even exceeding the actual yield strength of the material in the pipe body. Thus, any connection or coupling for joining together successive lengths of pipe must be able to withstand the axial loading without failure and still be resistant to leakage from internal pressures. As the pipe is alternately heated and cooled, the axial loading on the pipe and couplings may become alternately compressive and tensile, and throughout the coupling must maintain its seal with the pipe ends in resisting internal pressure.

Such couplings (connections) comprise a male and mating female coupling component. The male component is a suitably configured threaded portion at one end of the steel pipe, constituting the pin member of the coupling. A mating annular female component long enough in the axial direction to receive the pin ends of two adjoining lengths of pipe is internally configured and threaded at each end for mating engagement with the pin member, thereby completing the coupling. The annular female element is often referred to as the box element or box member of the coupling. Alternatively, one end of the pipe could be upset and internally threaded to constitute the female component of the connection.

Conventionally, the pin (male) member of the coupling or connection is tapered inwardly from the proximal end of the threaded portion to the distal end to mate with a similarly tapered female threaded member of the coupling. The taper facilitates entry of the pin member into the box member.

In pipe couplings, a seal is typically maintained. The seal may be effected between the mating threaded portions of the pin member and the box member of the coupling, but this kind of seal is subject to ready leakage. In other couplings, some auxiliary sealing element (e.g. an annular elastomer) is provided. In yet other couplings for use in which the pin member of the present invention is a species, the axial load-bearing threaded portions of the coupling do not themselves necessarily provide a seal (although they may do so); the seal relied upon is a separate metal-to-metal seal provided adjacent the axial load-bearing threaded portions, in both the pin (male) and the box (female) members of the coupling or the connection.

The threaded axial load-bearing portion of the coupling (or connection) should conform to certain known design principles. The total axial bearing surface provided by the full-depth load-bearing threads should be at least equal to the cross-sectional area of the pipe material. The angle of orientation of the stab flanks of the axial load-bearing threads should differ from the angle of orientation of the load flanks by not less than about 15 degrees. Excessive tilt of the distal end of the pin that causes the yield strength of the steel to be exceeded is generally to be avoided. Other general principles of thread design and coupling design will be known to those skilled in such design work and should be applied to the design of the connection of the present invention.

Various types of connections are known in which a metal-to-metal seal is provided. The designer may choose to provide on such surfaces a controlled degree of roughness, as by shot peening, grit blasting, glass bead peening, or helical microgroove threads having a pitch very small relative to the pitch of the loadbearing coupling threads.

U.S. Pat. No. 5,498,035, granted Mar. 12, 1996, describes a pipe connection whose male and female components are matingly threaded for coupling engagement, and each of which is provided with a frusto-conical sealing surface adjacent the load threads. The sealing surface is provided with microgroves or other shallow fine surface variations. The slope of the frusto-conical surface of the sealing area of the male component is slightly mismatched with that of the sealing area of the female component. This slight mismatch enables the sealing surfaces to engage one another with a bearing force that resembles that of a shrunk-fit circular cylindrical sealing arrangement with force peaks at each end of the sealing area and a sealing force greater than designed minimum in between the ends. This sealing characteristic enables the seal to be maintained despite possible damage to one end of the sealing area. The seal is designed for use with a high temperature graphite particle-containing lubricant with a relatively high content of solid graphic particles that can be mashed into the sealing surfaces when the connection is made up. A number of other preferred design characteristics of the connection are described in more detail in U.S. Pat. No. 5,498,035, incorporated herein by reference.

Although the connection described in U.S. Pat. No. 5,498,035 is a very effective connection, problems can sometimes arise if the connection is manufactured with some dimensions departing from optimum dimensions by close to maximum permitted tolerance. In particular, at the distal end of the pin (male) component of the connection, the available material for machining can, depending upon the particular nominal dimensions of a pin for certain pipe sizes, be relatively thin, rendering machining somewhat difficult, and tending to produce out-of-tolerance pins. Further, if the material yields too readily, there is a risk that the sealing efficacy of the connection may be impaired. Further, thinner material tends to be less resistant to occasional blows; a greater amount of damage can be done to the pin under a blow of given force if the material is thin.

SUMMARY OF THE INVENTION

Quite clearly, it would be helpful to avoid a number of the problems just mentioned by thickening the material at the pin tip. Given that some tilting of the pin, when the connection is made up, can be desirable from a sealing efficacy standpoint, and given the preference to avoid pipe-wall thicknesses exceeding certain limits, having due regard to the weight, expense, etc., it is usually preferred not to have to increase the overall pin-wall thickness.

Swaging the pin end might appear to offer some promise, but there are problems with swaging. For one thing, swaging increases the cost of manufacture. Further, a swaging operation will generally cause the creation of an internal rise or lip that projects into the interior of the conduit, undesirably, both from the standpoint of fluid flow and, more importantly, from the standpoint of being able to pass tools freely within the pipe, especially in oil and gas well pipe applications for which such connections are particularly suitable. Further, swaging can strain-harden the seal, possibly undesirably offering resistance to tilt, thereby interfering with the efficacy of the seal. The swaging may generate unpredictable metallurgical changes in the pin end. So a person skilled in the technology might be inclined to reject swaging as an answer to the foregoing problems.

We have found that swaging can be effective, provided that certain constraints are placed upon the swaging operation.

In the first place, the swaging should occur prior to final machining of the end of the pin.

Second, the swaging should preferably be followed by an internal cutting operation that removes most, or all, of any lip or rise of material that may have been formed that projects into the interior cylindrical conduit of the pipe in the vicinity of the pin.

Third, the swaging should extend from the distal end of the pin, proximally to include at least the distal end of the effective sealing surface, and preferably should extend proximally to that point along the sealing surface that would coincide reasonably closely with the terminating proximal portion of the effective sealing area of the pin. This terminating portion coincides with the distal termination of the female element sealing area when the connection is made up.

It also desirable when swaging to avoid such working of the material as will generate any appreciable undesirable change in the metallurgical qualities of the end of the pin.

Not only does swaging tend to improve the ease of machining the pin end of the pipe and to maintain pin end dimensions within tolerance, but also swaging can improve the efficacy of the auxiliary seal provided by the engagement of the distal end of the pin with the torque shoulder that is normally formed in the box member of a connection of this type; this auxiliary seal is more fully described in the aforementioned U.S. Pat. No. 5,498,035.

The pin-end profile may be machined and load threads formed using any suitable state-of-the-art threading machine; further, the swaging machine utilized can be equally conventional in design. A satisfactory manufacturing technique for the manufacture of the swaged pin end of the pipe, after cleaning up the pipe end to eliminate burrs, rust, grease, etc., is as follows:

Step 1: Machine the pipe end to a preliminary frusto-conical shape that will conform generally with the intended frusto-conical sealing surface configuration, leaving a little extra material for ease of implementing the following steps.

Step 2: Align the pipe end with the swaging roller configuration for the swaging operation. Either rotate the pipe end relative to the swaging roller assembly (that assembly typically having circular symmetry and comprising a number of rollers, typically at least three rollers, whose axes are set at a suitable angle to the pipe axis, so as when rotated to form a notional surface of revolution generally in the shape of a truncated cone). Either the swaging rollers may be rotated relative to the pipe or the pipe may be rotated relative to the swaging rollers; it is conceivable that both the pipe and the swaging rollers would rotate, but that would add to the complexity of the process. In the swaging operation, the pipe end should be aligned axially with the axis of the swaging roller configuration as a whole, so that a uniform contact area of the pipe end is presented to all rollers generally equally and simultaneously.

Step 3: Move the pipe axially toward the swaging roller configuration or vice versa while maintaining mutual relative rotation so that over a selected axial distance, the pipe end diameter is reduced. This step results in a radially inward displacement of some of the material at the pin end.

Optional alternative to steps 1, 2 and 3: Instead of an initial machining (step 1), begin, after surface cleaning, with the swaging of the pin end. However, select a more gradual taper for the swaging and continue the swaging axially over a longer axial distance than would be selected if steps 1, 2 and 3 are followed. Otherwise conform with the procedure set forth above for steps 2 and 3. The result is similar, but whereas material is removed by step 1, material is displaced rather than removed by this optional procedure.

Step 4: Apply a facing surface treatment to the face of the pipe end so as to render it generally planar and smooth. This can be accomplished by a surface machining followed by a grinding step or the like.

Step 5: Machine the pipe end so as to establish an outer-diameter profile suitable to the intended connection with the box member of the pipe connection to be formed. As part of this operation, the generally truncated conical sealing surface is optionally established on the pin, or this sealing surface formation step can be deferred (see discussion of steps 7 and 8).

Step 6: Machine the interior cylindrical surface of the pipe end to bring its inner diameter into conformity with the inner diameter of the box member of the intended pipe connection, so as to provide a smooth transition as between the pin interior surface and the box interior surface.

Step 7: Cut the load threads into the pin end of the pipe. Whether the threads are cut before the sealing surface is finally formed or whether instead the sealing surface is finally formed before the threads are cut, is optional; the relevant considerations are discussed further below in the detailed description.

Step 8: Apply any desired fine surface treatment to the sealing surface of the pin, such as microgrooving or peening, as discussed in the prior U.S. Pat. No. 5,498,035. (This step may be performed earlier if the sealing surface formation is effected earlier, as discussed above—see step 5.) Coating the pin end may also be desirable, as by copper or phosphate, for improved lubrication, sealing surface efficacy, etc.

Figure 7:
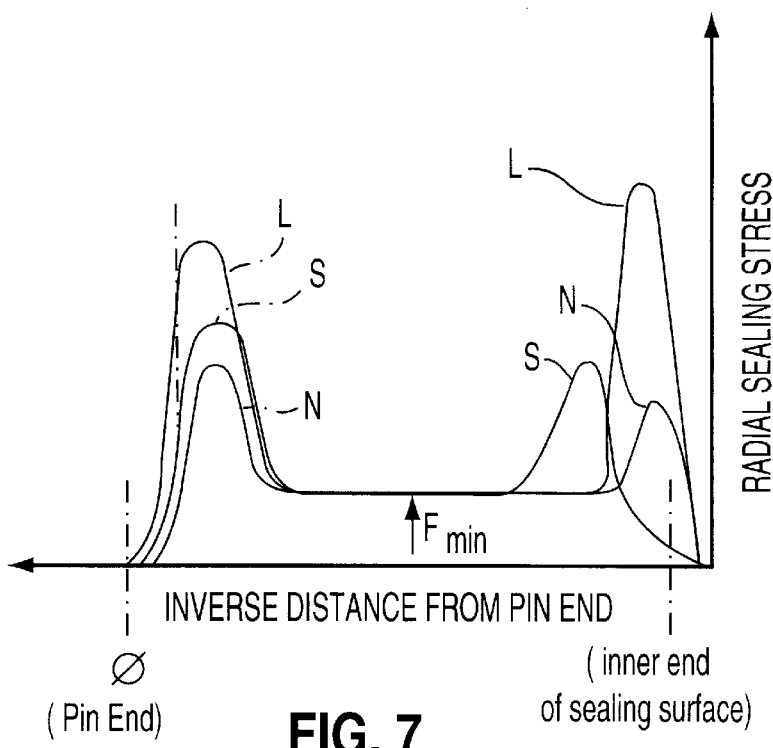
FIG. 7 is a graph illustrating comparatively the radial sealing stress over the sealing area of the pin for three situations, namely (1) no swaging; (2) swaging over a relatively short axial distance along the sealing surface (corresponding to FIG. 4); and finally (3) swaging over a relatively long axial distance encompassing the entire effective sealing area of the pin (corresponding to the FIG. 6 swaging), when the pipe connection has been made up.
Figure 8:
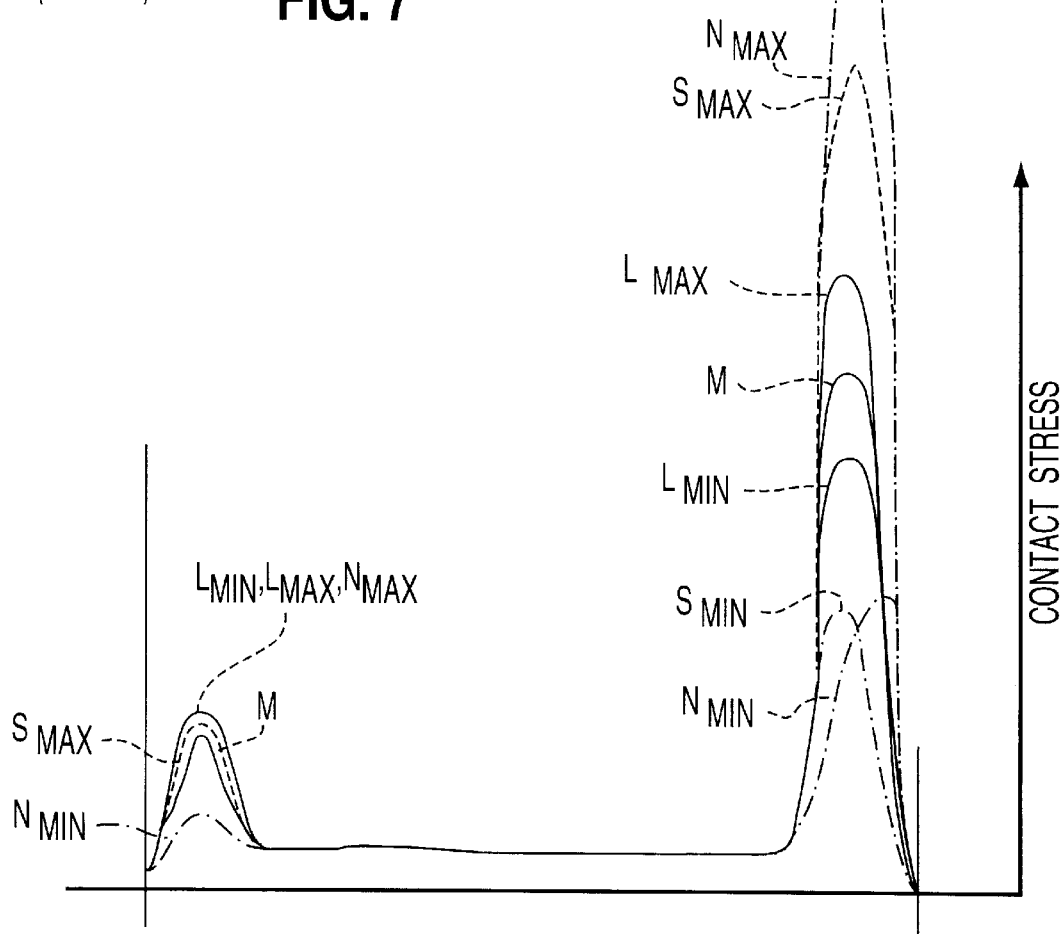
FIG. 8 is a graph comparing radial sealing stress over the axial distance occupied by the effective sealing area of the pin of a pipe connection following make-up, illustrating the effects of dimensional tolerance on the resulting stresses.

Both FIGS. 7 and 8 were prepared using computer-generated finite analysis techniques rather than from actual field tests.

DETAILED DESCRIPTION OF THE INVENTION

Figure 1:
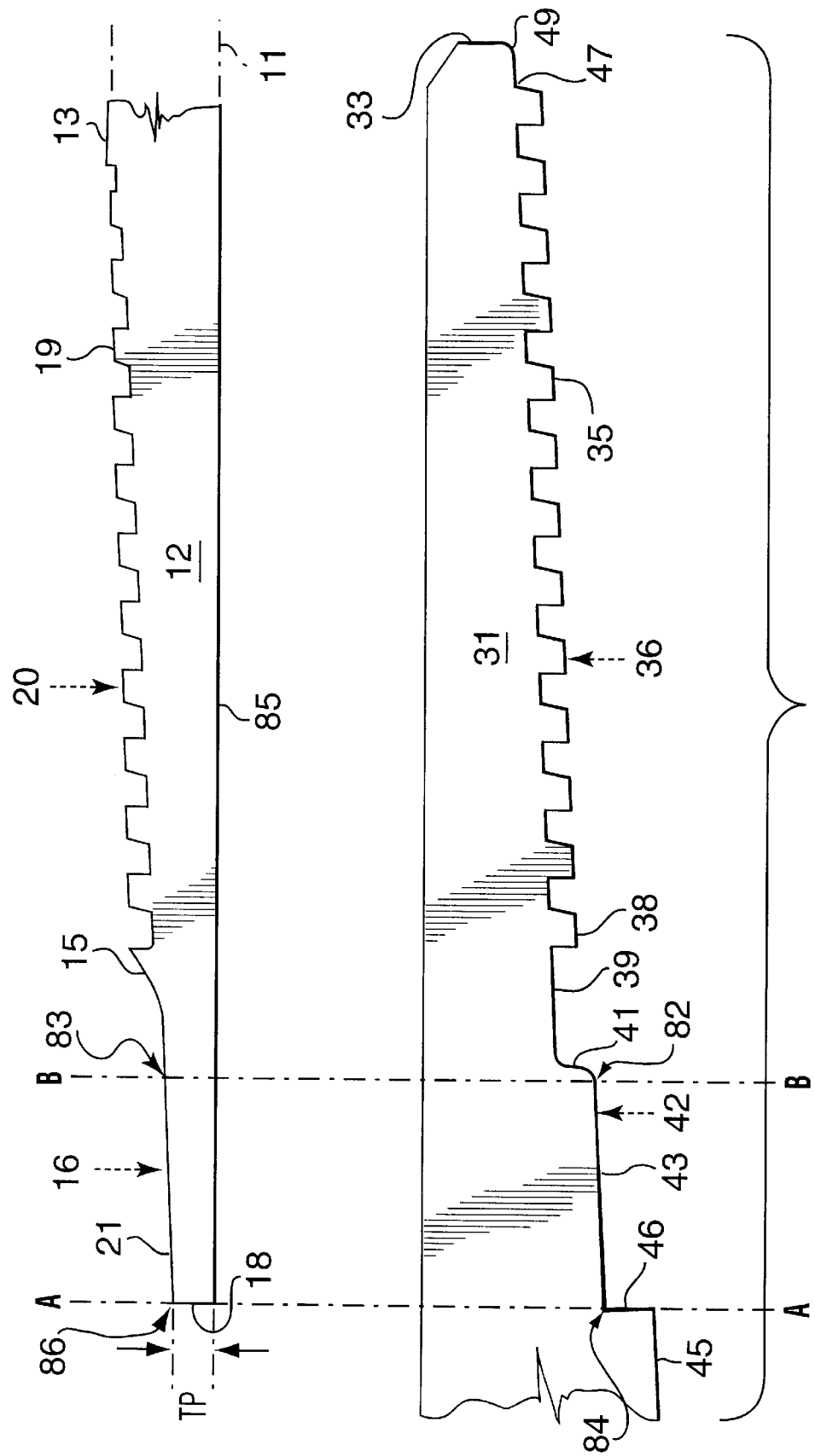
FIG. 1 includes (i) an axial partial section view of a pin member wall constructed in accordance with the invention, at the end of a length of pipe, as seen through the pipe wall, showing the coupling threaded portion and adjacent sealing portion for engaging a mating box member of the coupling; and (ii) aligned therewith so that mating portions are at the same relative axial positions, an axial partial section view of a wall portion of the mating female or box member of a coupling according to the invention showing the coupling threaded portion and sealing threaded portion for receiving the pin member.

Referring to FIG. 1, the end of a steel pipe, tube or casing 11 is formed to provide a pin generally indicated as 12. Pin 12 has a threaded portion 19 beginning at a chamfered starting thread 15 located at a position short of the distal end 18 of the pipe 11 and extending axially therefrom to terminate in a vanish point 13. The thread pitch line of threaded portion 19 of the pin 12 is sloped inwardly from its proximal end at vanish point 13 towards its distal end. The pin 12 terminates in a frusto-conical sealing area 21 provided with a controlled surface finish to provide a limited degree of roughness, e.g. helical microgrooves formed by way of machining, as more particularly illustrated in FIG. 7. The angle of slope of the sealing surface 21 along the frusto-conical surface is equal to that of the thread pitch line of the threaded portion 19.

Referring to the lower illustration of FIG. 1, a box 31 is internally configured and threaded to mate with the pin 12 of FIG. 1. Specifically, the female coupling element 31 is provided beginning at its distal end 33 with a threaded portion generally indicated as 35 extending into the interior of box member 31 as far as a terminating thread 38. The threads 35 (load threads) of box 31 are angled to mate exactly with the threads of pin 12. Further, the thread pitch line of threads 35 is at least approximately that of threads 19. In other words, the surfaces of revolution of the thread pitch lines for the coupling threads of the male and female coupling components are mating or nearly mating frusto-conical surfaces.

Further inwardly from thread 38 is a gap functioning as a relief groove for the threading compound, generally indicated as 39, terminating in a shoulder 41 which defines the outermost limit of an interior frusto-conically shaped, microgrooved sealing surface generally indicated as 43, which terminates in a limit or torque shoulder 45 forming a negatively inclined annular seat 46. The negative inclination of seat 46 tends to prevent the pin end 18 from climbing over the shoulder 45 when excess torque or high axial loading is applied to the coupling. Further, as mentioned, the torque shoulder's engagement with the distal end of the pin provides an auxiliary sealing area.

As discussed in greater detail in prior U.S. Pat. No. 5,498,035, normally both internal box and external pin mating surfaces are tapered to facilitate making up the connection and to help prevent disengagement. The taper angle chosen may vary with choice of steel material, as more fully in U.S. Pat. No. 5,498,035. For example, 150,000 psi material will require more interference than, say, 50,000 psi material. The increased interference prevents the distal end of the pin from moving out of engagement with the box. Taper angle should be selected with the foregoing in mind. It is desirable that internal pressure of gas (say) within the pipe coupling should not penetrate between the sealing surfaces to attempt to pry them apart. The coupling design according to the present invention and its precursor, as discussed in the aforementioned U.S. Pat. No. 5,498,035, is relatively free from such risk because of the significant amount of tilting of the distal end of the pin that occurs upon make-up of the connection. In any seal of this sort, the use of sealing surface sealing compound will be of considerable benefit.

Although the threaded portion 35 of box 31 and the sealing surface 43 of box member 31 are both tapered so as to receive in coupling and sealing engagement the mating pin 12 of FIG. 1, nevertheless the degree of taper of the interior sealing surface 43 of box 31 is deliberately chosen to be slightly steeper than the degree of taper of the mating sealing surface 21 of pin 12. The reason for this is to provide a preferred bearing load-versus-length relationship, as discussed in greater detail in U.S. Pat. No. 5,498,035.

In FIG. 1, the effective sealing areas of the box 31 and pin 12 lie between lines A—A (coinciding with the pin tip 18 and with the pin tip seat 46) and B—B (coinciding with the distal termination of the box sealing area 43 and the beginning of the chamfered shoulder 82). Note that the available pin sealing area typically extends further inwardly from line B—B toward starting thread 15, but since that available area cannot make contact with a counterpart sealing area in the box member 31 of the connection, it is of no assistance in establishing a seal. Only the effective sealing area lying between lines A—A and B—B is of concern for the purposes of the present description. The swage to be discussed below could even be continued beyond line B—B toward starting thread 15 of pin 12, if the designer expects an improved contact stress over at least part of the sealing area to result from such continuation, potentially improving the sealing efficacy of the connection when made up.

Figure 2:
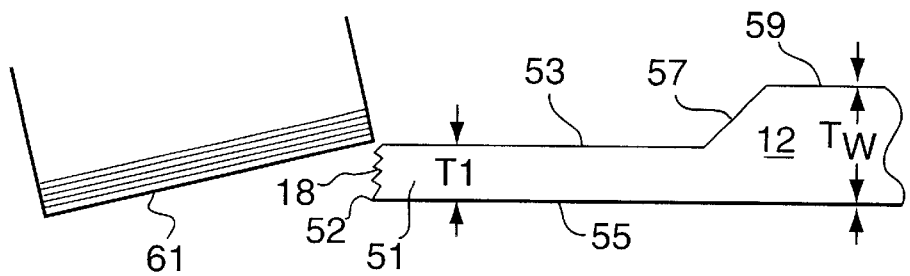
FIG. 2 is a schematic fragmentary section elevation view of a portion of the end wall of the pin end of a pipe about to engage a swaging roll.

FIG. 2 illustrates the roughly formed distal portion of the pin element 12 prior to final machining. The pin end is shown as formed on a pipe section of initial wall thickness $T_w$ having an inner cylindrical wall surface 55 and an outer cylindrical wall surface 59. At the pin end, the outer wall surface 59 is shown as having been roughly machined or shaped inwardly via a transitional frusto-conical surface 57 culminating in an annular cylindrical distal portion whose outer cylindrical wall surface 53 is inset from wall surface 59 of the main body of the pipe section. At this stage, the terminating distal end 18 of the pin 12 is rough-surfaced.

To enable the distal end of the pin 12 to be swaged, the pin 12 is moved to the right (as seen in FIG. 2) into contact with an array of swaging rolls 61 (only one of which appears in FIG. 2) angled inwardly relative to the pin (or else the swaging rolls are moved to the left as seen in FIG. 2 relative to the stationary pin 12; what is required is that there be relative movement of the pin 12 and swaging roll array toward one another). The swaging rolls 61 are formed in a circular symmetrical array about the distal end of the pin 12; at least three swaging rolls 61 would be present in such array, and the number of swaging rolls to be used could be higher than three, if desired.

It is apparent that as the distal end of the pin 12 is brought into contact with the swaging rolls 61, the material at the distal end of the pin 12 will be strained and forced to deform generally radially inwardly.

Figure 3:
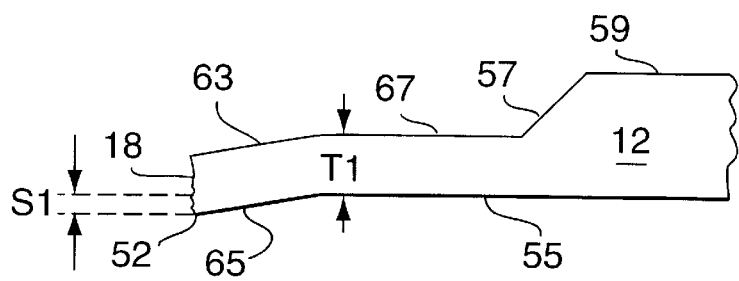
FIG. 3 is a schematic fragmentary section elevation view of the wall of the pin end of FIG. 2 following swaging of the pipe material over a relatively short axial distance inwardly from the distal end of the pin.

The distal end of the pin 12, after the swaging operation has been completed, is shown in FIG. 3. It can be seen that at the very tip of the pin 12, the steel of the pin has an inward inclination generally corresponding to the inclination of the swaging roll 61 relative to the pin axis. This inclination manifests itself as an outer generally frusto-conical swaged surface 63 and an inner generally frusto-conical swaged surface 65 at the distal end of the pin 12. Residual generally cylindrical outer surface 67 is axially shorter than the original outer surface 53 owing to the swaging. The innermost tip 52 of the distal end of pin 12 has been displaced radially inwardly relative to its initial position through a distance S1.

Figure 4:
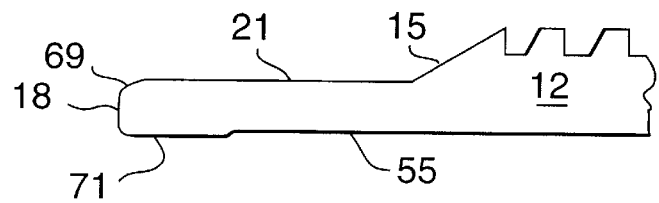
FIG. 4 is a schematic fragmentary section elevation view of a portion of the pipe wall of the pin end of FIG. 3 showing the final profile after facing, profile machining load threads of the load threads of the pin.

After machining, the distal end of pin 12 has been configured as seen generally in FIG. 4. The pin 12 now has an elongated sealing surface 21 formed generally at its distal end, subject to a terminating chamfered generally frusto-conical outer distal surface 69 that is intended to ease the penetration of the pin into the box coupling element of the connection when the connection is made. The distal end surface 18 is shown machined to form a planar annular surface. A residual internally projecting rim 71 is a remnant of the swaging operation, thickening the pin at the distal tip so that during the machining operation and during the making of the coupling, the distal end of the pin will have adequate material to resist inappropriately large deflection and/or strain while undergoing machining or when the connection is made, as the case may be. The surface 71 should be tapered or chamfered or both and bored to a final inner diameter so as to generate a smooth transition between the inner cylindrical surface 55 of the pin element and the corresponding inner cylindrical surface of the mating box element.

The pin load threads 19 may be machined either before or after the final machining of the sealing surface 21. In FIG. 4, the load threads 19 are shown as having been machined. It is expected that generally it will be preferable to machine the sealing surface 21 after the load threads 19 have been machined, unless appropriate measures are taken to eliminate the turning chips and other metal debris so as to avoid scraping or damaging the sealing surface 21. Furthermore, machining the load threads may generate residual stresses that could cause minor deformations in the sealing surface 21.

On the other hand, if the sealing surface 21 is machined before the load threads are machined, then the sealing surface dimensions can be measured to determine whether the sealing surface is within tolerance. If the surface is out of tolerance, then the pipe end can be re-machined to generate a sealing surface within tolerance. By proceeding in this way, an out-of-tolerance seal generates only a minor amount of lost material and lost machining (production) time. But if the load threads 19 are machined before the sealing surface 21 is machined and then if the sealing surface 21 is found to be out of tolerance, a great deal of material would have to be removed and the pipe end re-machined at greater cost in production time. It is up to the manufacturer to balance these conflicting objectives and advantages and to choose the procedure that is considered to be optimum in the particular manufacturing operation being conducted.

In order to avoid undesirable change in the metallurgical characteristics of the steel at the distal end of the pin, suitable constraints on the speed and feed rates of swaging and machining operations and the cutting lubricant used, should be observed. Generally speaking, such constraints are best empirically determined in any given machining application—the characteristics of the pin end of the metal can be determined by conventional metallurgical examination, and feed, speed or lubricant adjustments made to the swaging and machining operations if undesirable metallurgical changes occur in the vicinity of the distal end of the pin. The implementation of the present invention consistent with the foregoing objectives should be readily possible by observing usual and normal machine shop practices.

Figure 5:
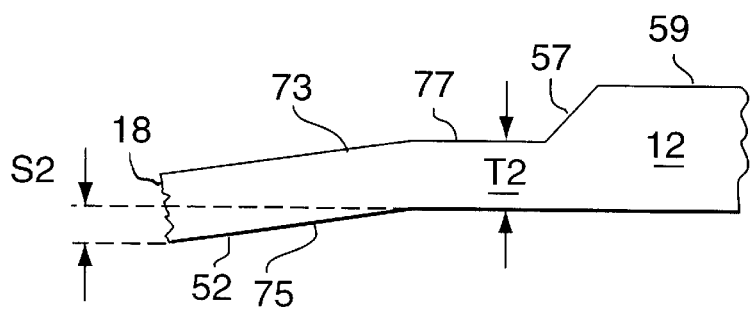
FIG. 5 is a schematic fragmentary section elevation view of a pin end wall showing the wall profile following a swaging operation conducted over an axial distance of the pin end that extends over the entire sealing area of the pin.

FIG. 5 represents the results of a pin swaging operation that is a preferred alternative to that illustrated in FIG. 3. FIG. 3 illustrates the result of a swaging operation limited to a fairly short portion of the pin end sufficient to establish a suitable thickening of the distal end of the pin and to establish a foundation for formation of the interior rim 71 illustrated in FIG. 4. However, FIG. 5 is the result of a swaging operation that is continued in a proximal direction well beyond the distal end of the pin 12, which extends to the majority of the axial length of the pin 12 that will eventually be occupied by sealing surface 21, and preferably extends axially over all or nearly all of the effective sealing surface 21 of the pin 12.

In preparation for the swage of FIG. 5, the pin end is machined to remove material from the periphery of the pin in a manner similar to that previously described so as to generate a preliminary profile generally similar to that illustrated in FIG. 2, except that the remaining material over the sealing area will have a thickness T2 (FIG. 5) that is typically greater than corresponding material thickness T1 for the profile of FIG. 1.

While the angle of the axes of the swaging rolls relative to the pipe end for the more extensive FIG. 5 swage may be chosen to be about the same as the angle chosen for the lesser swage of FIG. 3, nevertheless, in order to avoid unduly severe deformation of the distal end of the pin for the more extensive swage of FIG. 5, the angle of the axis of the swaging roll to the pin axis can be chosen to be a shallower angle than would be used for the formation of the pre-machined pin end of FIG. 3. In other words, the slopes of the post-swaging frusto-conical outer surface 73 and inner surface 75 of FIG. 5 can be at a shallower angle to the pin axis than the counterpart frusto-conical surfaces 63, 65 illustrated in FIG. 3. If necessary, a hot swage or a post-swaging heat treatment may be utilized for the more extensive swage of FIG. 5, in order to minimize the risk of undesirable loss of dimensional coherence, of useful mechanical properties, or of other desirable pin-end qualities.

Whatever the choice of swage roll configuration or technique for the more extensive swage of FIG. 5, the innermost edge 52 of the distal portion of pin 12 will, as a result of the swaging operation that produces the interim FIG. 5 pin configuration, be displaced inwardly through a distance S2 that will typically be somewhat greater than the distance S1 applicable to the FIG. 3 configuration. Obviously, the remaining portion 77 of the original outer cylindrical surface 53 will also be shorter than the counterpart portion 67 illustrated in FIG. 3.

Figure 6:
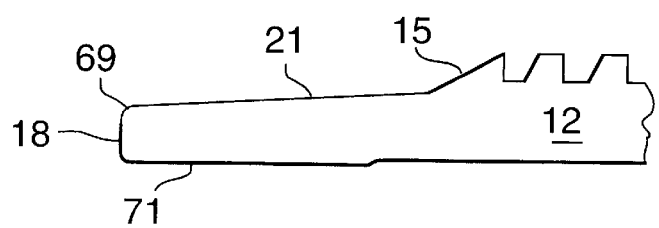
FIG. 6 is a schematic fragmentary section elevation view of a portion of the pipe wall of the pin end of FIG. 5 showing the final profile after facing, profile machining and cutting of the load threads of the pin.

After final machining, the swaged pin end of FIG. 5 has the profile depicted in FIG. 6. The FIG. 6 profile is generally similar to the profile of FIG. 4, except that the transitional ridge 71 is axially longer in the FIG. 6 variant than it is in the FIG. 4 variant.

The graph of FIG. 7, based on computer-generated finite analysis of representative pipe connections, depicts the stress distribution of the expected radially-directed sealing stress on the pin sealing area after the pipe connection has been made up, and after it has been exposed to one complete thermal cycle, for three different pin variants, as discussed below. A thermal cycle involves taking the connection from about ambient temperature (say about 20° C.) to a temperature in excess of 100° C. (say about 350° C.), and then returning the temperature back to about the 20° C. level, or thereabouts, the connection throughout the process being held rigid and axially restrained, as by encasing in concrete or between platens. This cycle is intended to simulate changes in a demanding oil or gas well thermal environment. The graph has been prepared by computer-generated finite analysis rather than from actual field measurements. In both FIGS. 7 and 8 the stress at the distal end of the pin is shown at about the left limit of the graph and the stress at the inner end of the effective sealing surface is shown at about the right limit of the graph.

FIG. 7 illustrates the comparative expected results of (i) applying no swaging to the pin end, (ii) applying limited swaging over an axial distance from the pin tip that would overlap a portion but less than half of the sealing area, and (iii) applying full swaging over an axial distance overlapping the entire effective sealing area of the pin end. Three separate curves result; curve N represents the expected performance of a pin end seal on which no swaging has been effected; curve S represents limited swaging over something less than half of the effective sealing area of the pin end nearest the distal end of the pin; and curve L represents the expected radial sealing stress in the made-up pipe connection for a pin end that has been given maximum swaging through an axial distance covering the entire effective sealing area of the pin end. The swaging for curve S would extend axially typically about 0.3" and the swaging for curve L would typically be about 0.7" or somewhat less, depending upon the actual effective sealing area. Curve N represents the expected radial sealing stress from one end of the effective sealing area of the pin to the other in general conformity with the result obtained by the practice of prior U.S. Pat. No. 5,498,035.

It can be seen from the FIG. 7 graph that swaging only a portion of the axial distance occupied by the effective sealing area (curve S) does generate some improvement in the radial sealing stress at both extremities of the pin sealing area relative to the non-swaged situation (curve N); the improvement, however, is modest relative to the much higher radial sealing stresses expected when the pin end is swaged through an axial distance over the entire sealing area of the pin (curve L), since the stress peaks for curve L are appreciably higher than the stress peaks for curve S at both ends of the effective sealing area.

It is of course understood, as described more extensively in U.S. Pat. No. 5,498,035, that a high radially-directed contact stress at each end of the effective pin sealing area is desirable in order to maintain an effective seal under demanding operating conditions of the pipe connection.

Between the stress peaks at either end of the effective sealing area of the pin, the radial sealing stress typically falls to a value shown as $F_{MIN}$ being the minimum design sealing force throughout the seal area. (The value $F_{MIN}$ may be zero or close to zero, at least under numerical analysis; the critical contact forces are those at the ends of the sealing surface, so the stress value in between the end peaks is normally not critical). Between the ends of the sealing area, neither of the swaged pin options described provides any appreciable improvement relative to the unswaged pin end. However, as FIG. 7 reveals, the improvement at each end of the effective sealing area is quite significant and desirable when the swage is applied to the pin end.

The curves appearing in FIG. 7 reflect expected results from those pin ends that are expected to benefit from swaging. Pin ends that have adequate material thickness for all required machining will not benefit from the swaging operation nearly as much, if at all, as pin ends whose material thickness is only marginal at the distal end of the pin. So the curves that appear in FIG. 7 may be expected to vary considerably from one pin end to another, depending upon the material thickness, the grade of steel, the permitted tolerance, and other factors that would be expected to cause variations in ultimate sealing efficacy from one pin to another.

FIG. 8 demonstrates the consequences of departures from nominal dimensions at both maximum dimensional tolerance and minimum dimensional tolerance, again for the non-swaged and the lesser and greater swaged pin ends discussed above. In FIG. 8, curves S, L and N have the same significance as discussed with reference to FIG. 7, the subscript MAX being used with reference to a pin end/box combination of maximum tolerance, and the subscript MIN with reference to a pin end/box combination of minimum tolerance. In addition to the maximum and minimum tolerance ranges illustrated by the curves of FIG. 8 for the non-swaged (N), lesser swaged (S) and more extensive swaged (L) pin ends, there is also a curve M that would apply to a pin end/box combination of nominal dimensions (curve M was devised on the assumption that no swaging is required and, therefore, corresponding to the "N" curves.)

FIG. 8 illustrates that the effective sealing area stress peaks for the unswaged pin end (curves ($N_{Max}$ and $N_{MIN}$, respectively) will tend to depart from idealized curve M both at maximum dimension within tolerance ($N_{MAX}$) and at minimum dimension within tolerance ($N_{MIN}$) by a greater degree than either the lesser swaged (S) or more extensively swaged (L) pin ends within the same dimensional range. Ideally, minimal departure from curve M is desirable and, consequently, it can be seen that the curves for the more extensively swaged option, both for maximum and minimum dimensional limits within tolerance ($L_{MAX}$ and $L_{MIN}$, respectively), show less variance from idealized curve M than either of the other options (unswaged, the two N curves, and lesser swaged, the two S curves $S_{MAX}$ and $S_{MIN}$, respectively).

Again, for FIG. 8 as for FIG. 7, the specific curves for specific pin ends will be expected to vary considerably, depending upon the improvement obtained by swaging of any given pin end and other factors, such as alloy composition, steel strength and ductility, etc.

In field use, pipe connections of the type to which prior U.S. Pat. No. 5,498,035 and this invention relate advantageously make use of a thread and sealing surface sealing compound that includes mashable solid particles. In the prior patent, mashable graphite particles are specifically mentioned; however, other mashable solid particles may be selected instead. An empirical approach to sealing surface compound selection is recommended, as field conditions in which the pipe connection may be used are quite variable.

EXAMPLE

A suitable wall thickness for 8⅝ inch pipe is 0.304 inches. Pipe of this size used in a pipe connection of the type discussed above may be susceptible to pin end material thickness problems of the sort discussed earlier, and therefore may be improved by swaging.

As a preparatory step to precede the swaging operation, the wall thickness is slightly reduced at its tip by machining. The amount of reduction should be approximately 10% to 50% at a taper that is consistent with the geometry of the desired pipe end configuration, along an axial length that typically does not exceed the length of the pin end sealing surface.

The pin end of the pipe is then fed into a swaging-roller arrangement, of the type previously described, whose swage rollers are angled at a suitable swaging angle, typically in the range 5° to 15° to the horizontal. The pin end of the pipe is fed into the swage rollers at a speed rate of 0.02 inches per revolution, and at a rotary speed of about 350 s.f.p.m. For a minimum effective swaging, the axial length of the swaging should be at least about ¼ inch. However, for optimal swaging, the axial length of the swaging should be approximately 1 inch, where the sealing surface is something less than 1 inch, say ¾ inch or perhaps slightly less.

The swaging operation will impart to the distal end of the pin a roll-over of metal that will extend radially inwardly into the bore of the pipe to a maximum of approximately 0.05 inches. The interior wall of the pipe is then machined so that upon make-up of the pipe connection, the interior diameter of the pin in the made-up position is approximately equal to that of the inside diameter of the box.

This swaging operation leaves a seal-tip thickness of approximately 0.125 inches, if the swaging is applied over at least an axial length of 0.25 inches to 0.3 inches from the distal end of the pin. If, preferably, the swaging is applied over about 0.75 inch to about 1 inch, then the pin-tip thickness is approximately 0.15 inch.

The swaging operation tends, after bore machining of the swaged pipe, to create a step or internal ridge at the seal tip, representing a thickened portion of the distal end of the pin. This ridge will vary in length from approximately 0.05 inches to 0.3 inches axially, and will have a radial height up to about 0.02 inches.

If, following swaging, the bore at the distal end of the pin is machined to a diameter approximately equal to the center-bore diameter of the box, but taking into account eventual pin tilt upon make-up, a smooth transition between the interior surfaces of the pin and box will result. Assuming that the bore diameter of the box, or female coupling element, is 7.97 inches, then during make-up of the connection, the final diameter of the pin nose will be slightly reduced due to pin tilt, resulting in a very smooth transition from the interior pin bore to the interior bore of the box or coupling.

Once the foregoing swaging and machining operations are complete, thread machining and sealing surface machining follow. Because these seal and thread formation machining steps may distort the metal of the pin wall somewhat, a superior result is obtained if the last machining operation is the final machining of the seal surface. However, the reader is referred to the discussion above relative to competing design considerations and objectives; a designer may have valid reasons for choosing to machine the threads after the sealing surface is formed.

By way of comparison, in one specific test situation, it was found that if the swaging and associated machining operations are not applied to pins of 8⅝ inch diameter, then wall thickness at the distal end of the pin was found to range from about 0.085 inches to about 0.110 inches. However, if the swaging and associated machine operations described in this example are applied over an axial distance of about 0.3 inches, a typical wall thickness at the distal end of the pin then was found to be about a nominal 0.115 inches, with a variation of no more than about 0.005 inches—a significant improvement over the comparative unswaged pin end results.

Depending upon the size of pipe being machined and especially on the nominal wall thickness following initial roughing, and depending upon the characteristics of the machine tools used, swaging will tend to be more effective on some pipe sizes than on others. Where tolerances applicable to outer and inner pin diameter tend to produce distal pin wall thicknesses that vary considerably between maximum and minimum values, then swaging tends to be quite helpful in establishing a relatively uniform ultimate wall thickness at the distal end of the pin, suitable for undergoing various machining operations without undue distortion of the material at the distal end of the pin. However, if pipe of a given diameter manufactured within the tolerances applicable to same is found to have without swaging a generally uniform wall thickness at the distal end of the pin, swaging may not be sufficiently beneficial to justify the additional expense.

What is claimed is:

1. In a method of manufacturing a male component for use in a pipe connection of the type having said male component and a mating female component, each having in the vicinity of a respective distal end thereof a threaded area for mating threaded connection therebetween, and each provided with an effective sealing area adjacent the threaded area, the effective sealing areas of the coupling components being formed as mating tapered frusto-conical surfaces, the slope of the frusto-conical sealing surface of the male component being slightly less than that of the frusto-conical sealing surface of the female component, the respective effective sealing areas of the components being in axially aligned sealing engagement when the pipe connection has been assembled, the distal end surfaces of the distal end of the male component being defined at least in part by a series of machining steps applied to the distal end of the pipe; the improvement comprising, before the final machining step of said series, swaging the distal end of the male component over an axial length including a substantial portion of the effective sealing area of the male component.

2. The improvement defined in claim 1, comprising swaging the distal end of the male component over an axial length including at least about ⅓ of the effective sealing area of the male component.

3. The improvement defined in claim 1, comprising swaging the distal end of the male component over an axial length including at least about half of the effective sealing area of the male component.

4. The improvement defined in claim 1, comprising swaging the distal end of the male component over an axial length including substantially the entirety of the effective sealing area of the male component.

5. The improvement defined in claim 1, comprising the additional step, following swaging, of machining the interior surface of the male component to provide a smooth transition from the interior surface of the male component to the interior surface of the female component when the connection is made up.

6. The improvement defined in claim 5, wherein the machining includes an internal cutting and removal of material from the inner surface of the male component in the vicinity of the distal end thereof to reduce the size of any protrusion of material into the interior of the male component that prior to said machining had been formed by the swaging.

7. The improvement defined in claim 6, comprising the additional step of surface treating the radial face of the distal end of the male component to render said radial face planar and smooth.

* * * * *

UNITED STATES PATENT AND TRADEMARK OFFICE
CERTIFICATE OF CORRECTION

PATENT NO. : 6,024,646
DATED : February 15, 2000
INVENTOR(S) : John F. Reed, et. al.

It is certified that error appears in the above-indentified patent and that said Letters Patent is hereby corrected as shown below:

Col. 5, line 19, change "load threads" to --and cutting--;

Col. 6, line 27, change "fully in" to --fully explained in--;

Col. 10, line 58, change "curves ($N_{Max}$" to --curves $N_{Max}$--.

Signed and Sealed this

Twentieth Day of March, 2001

Attest:

NICHOLAS P. GODICI

*Attesting Officer*  *Acting Director of the United States Patent and Trademark Office*